United States Patent Office 3,422,164
Patented Jan. 14, 1969

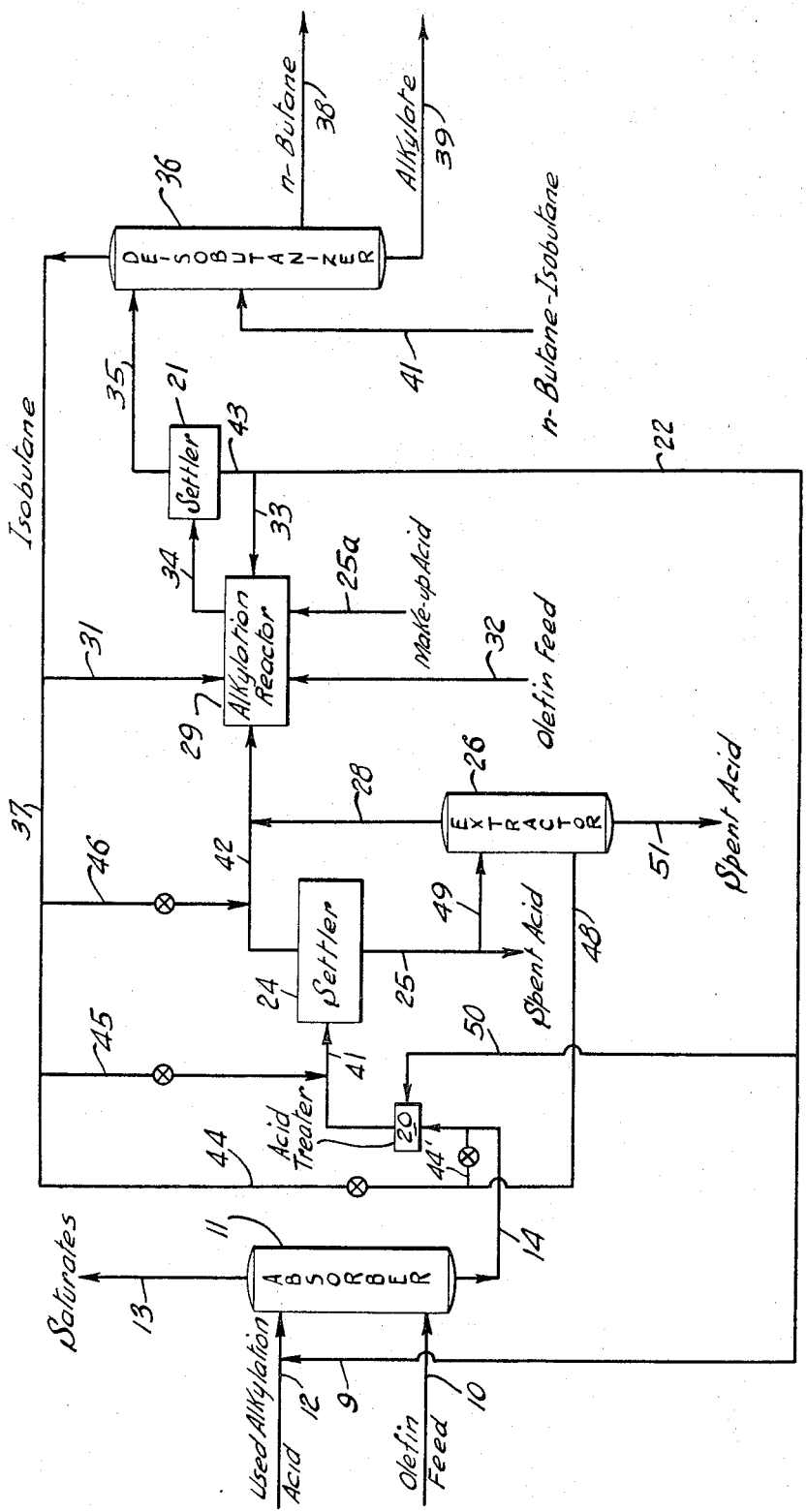

3,422,164
ALKYLATION PROCESS EMPLOYING ACID TREATMENT OF THE ACID-OLEFIN ABSORPTION PRODUCT
Arthur R. Goldsby, Chappaqua, N.Y., assignor to Texaco Inc., New York, N.Y., a corporation of Delaware
Continuation-in-part of applications Ser. No. 516,448, Dec. 27, 1965, and Ser. No. 510,904, Dec. 1, 1965.
This application Nov. 22, 1966, Ser. No. 596,253
U.S. Cl. 260—683.62        11 Claims
Int. Cl. C07c 3/54

ABSTRACT OF THE DISCLOSURE

A process for removing polymeric oil alkylation contaminants from used sulfuric acid alkylation catalyst wherein olefins are absorbed in the used acid in the presence of excess olefins with resulting conversion of free acid to dialkyl sulfate, the absorption product is treated with a small amount of strong sulfuric acid to react with any free polymeric oil alkylation contaminants, and the dialkyl sulfates are recovered from the acid treated absorption product, as by extraction with isobutane.

---

This application is a continuation-in-part of application Ser. No. 516,448, filed Dec. 27, 1965, now abandoned, and application Ser. No. 510,904, filed Dec. 1, 1965, now abandoned, both of which applications are continuations-in-part of application Ser. No. 386,486, filed July 28, 1964, now U.S.P. 3,234,301, entitled "Sulfuric Acid Recovery Process" which patent was a continuation-in-part of application Ser. No. 50,161, filed Aug. 17, 1960, now abandoned.

This invention is directed to improvements in the utilization of alkylation acid e.g. sulfuric acid used in the alkylation of olefins or aromatics in the presence of alkylation acid, e.g. sulfuric acid catalyst. More particularly, it is directed to a method of maintaining purity of the hydrocarbon stream to the alkylation zone by efficient means of removing acid-oil complex formed during the absorption of the olefin and alkylation. This invention comprises the absorption of an olefin in alkylation acid, e.g. used sulfuric acid, treatment of the absorption mixture with sulfuric acid to eliminate alkylation contaminants, and alkylation of the treated absorption product.

The over-all commercial alkylation of isoparaffins of my invention with olefins is performed by first charging an olefin into a vessel into which, from a separate line, is fed used sulfuric acid originating from the alkylation reaction zone to form an absorption product comprising dialkyl sulfate, acid alkyl sulfate and excess acid. The absorption product is then charged into an extraction tower through which is passed a suitable hydrocargon, e.g. isobutane, to remove therefrom the dialkyl sulfate. The isobutane containing the dissolved dialkyl sulfate is then fed into an alkylation zone into which additional olefin and isoparaffin are fed. The alkylation zone can also contain additional sulfuric acid. In the process of forming the absorption product, there is formed a small amount of an oily material believed to be a conjunct polymer or conjucated cyclic diene whose presence in the alkylation zone is undesirable as it tends to consume sulfuric acid or interfere with the alkylation reaction. It is desirable to provide means for removing the oil, as well as the contaminants in the used alkylation acid, from the system so that the dialkyl sulfate, e.g. dipropyl sulfate when charged to the alkylation zone contains a minimum amount of oily impurity. The oily material is generally soluble in hydrocarbons and acid. If the stoichiometric amount of sulfuric acid, which is approximately an equal weight basis the polymeric oil, is mixed with the oil in a solvent, essentially quantitative removal of the oil can be obtained by formation of an acid-oil complex or reaction product. In addition, apparently the acid tends to dissolve and thereby remove any acid-oil reaction product or complex already present. The acid oil reaction product or complex can be separated by gravity settling. The separation is enhanced if hydrocarbon is present, and in general, the more hydrocarbon the better the separation, especially in the presence of dialkyl sulfates. To insure substantially complete removal of the oil and also any water present, an excess of acid can be employed. As disclosed in my aforementioned patent, the olefin-acid absorption mixture is first separated into an acid phase and an organic phase containing substantially all of the alkyl sulfates, before the organic phase is treated with sulfuric acid to remove alkylation contaminants. This works satisfactorily but it requires extra equipment and processing in relation to the overall process.

It is an object of this invention to provide a simple and efficient method for treating the absorption product to form an acid-oil complex so that the organic phase when separated from the acid phase is substantially free from the acid-oil complex contaminants.

It is another object of this invention to provide such a process for forming an acid-oil complex in an efficient manner whereby separation of the acid phase from the organic phase resulting from the absorption product is not needed prior to treatment with the sulfuric acid.

These and other objects of my invention will become apparent from the following more complete description of my invention, accompanying drawings and appended claims.

My invention is an improvement in the process for alkylating an isoparaffin hydrocarbon with an olefin wherein the olefin is contacted with used sulfuric acid e.g. sulfuric acid from the alkylation reaction zone to form an absorption product comprising a hydrocarbon absorption phase and an acid absorption phase, the hydrocarbon absorption phase containing dialkyl sulfate ester and alkylation contaminant in the form of an oily material and wherein the dialkyl sulfate is charged to an alkylation zone. In one embodiment of the invention, the improvement resides in treating the absorption product comprising the hydrocarbon absorption phase and the acid absorption phase with acid to remove from the hydrocarbon absorption phase the oily material or alkylation contaminant in the form of an acid-oil complex prior to separating a major portion of the dialkyl sulfate from the absorption product. I have found that the oily material which is, at least to some extent, soluble in the hydrocarbon absorption phase can be removed by reacting it with an acid, suitably sulfuric acid, whereby the acid-oil complex formed is removed from the hydrocarbon absorption phase rendering the phase when separated from the acid adsorption phase relatively free of alkylation contaminant. The hydrocarbon absorption phase can be fed directly to the alkylation reactor without any subsequent treatment to remove the alkylation contaminants. In addition the treatment with acid binds or ties up any oily material in the acid phase so that it remains in the acid even after subsequent more efficient extraction with hydrocarbon. I prefer to use sulfuric acid as the acid which treats the entire absorption product to bind the oily complex in the form of an acid-oil complex insoluble in the hydrocarbon absorption phase. When using used sulfuric acid it is possible to recycle a portion of the used sulfuric acid from the alkylation reaction zone so that it can be used in the acid treater and also to recycle this same acid or a portion thereof into the absorber in which the dialkyl sulfate is formed. It should be apparent, however, that the sulfuric acid employed to acid treat the entire absorption product can have a different source of original than the used sulfuric acid employed in the absorption step. In fact, fresh acid can be employed as the acid added in the acid treating step although used sulfuric acid is preferred from an economic standpoint. The chief advantages of my invention reside in simpler and less expensive or elaborate equipment needed to remove the acid-oil complex from the dialkyl sulfate and in a relatively simple operation for the formation of a relatively pure hydrocarbon absorption phase.

Having set forth the general nature of the invention, it can be more readily understood from the following more detailed description including the accompanying drawing. Although the drawing illustrates general arrangement of apparatus in which the process of my invention can be practiced, it is not intended to limit the nature of the invention to the particular apparatus or material described. It can be applied to commercial alkylation processes, such as effluent refrigeration, cascade autorefrigeration, closed cycle refrigeration, and emulsion flashing.

In the accompanying drawings forming a part of this specification, the invention is illustrated employing the introduction of isobutane, a suitable paraffin, at optional points, and with an optional extraction step on the acid absorption phase. It should be understood in the following description that the recitation of specific hydrocarbons is set forth merely to illustrate suitable hydrocarbons which can be employed in the overall process, propylene being used to illustrate a suitable olefin and isobutane being employed to illustrate a suitable isoparaffin. This invention is not limited to the use of the specifically illustrated hydrocarbons.

Referring to the accompanying drawing, an olefin stream in the liquid phase comprising propylene with lesser amounts of ethylene and butylenes in admixture with saturated hydrocarbons is passed through line 10 to absorber 11. Liquid and gas formed by the exothermic heat of reaction are contacted countercurrently with descending sulfuric acid introduced into absorber 11 near the top through lines 22, 9 and 12. The sulfuric acid absorbs propylene and butylenes forming the corresponding esters, and the remaining gases containing ethylene and saturated hydrocarbons are discharged from the top of absorber 11 through line 13.

The absorption product is passed from the bottom of tower 11 through line 14 to acid treater 20. Used acid from alkylation settler 21 is passed through lines 22 and 50 to acid treater 20. The reaction product from acid treater 20 is passed through line 41 to settler 24. Acid phase comprising alkylation contaminants, such as the acid-oil complex and water from settler 24 is discharged as spent acid through line 25, or to extractor 26 through line 49 if desired.

The upper organic phase from settler 24 comprising isobutane and alkyl sulfates is passed from settler 24 through line 42 to alkylation reactor 29. Isobutane through lines 37 and 31, olefin through line 32, and recycle or used alkylation acid through lines 43 and 33, and fresh make-up acid through line 25a, are charged to alkylation reactor 29.

Alkylation reaction mixture is passed through line 34 to settler 21. Used acid from settler 21 is passed through lines 22 and 50 to acid treater 20, and through lines 22, 9 and 12 to absorber 11. Hydrocarbon comprising isobutane and alkylate are passed to deisobutanizer 36 through line 35, after neutralization in conventional manner not shown. Field butanes comprising n-butane and isobutane are also charged to deisobutanizer 36 through line 41.

Isobutane is taken off the top of the tower 36 and passed through lines 37 and 31 to alkylation reactor 29. n-Butane is taken off as a side stream through line 38 from deisobutanizer 36. Alkylate is discharged from the bottom of deisobutanizer 36 through line 39.

Although an isostripper type fractionator 36 is shown in which reflux is furnished by introducing the fresh feed near the top of the tower, other conventional fractionation schemes can be used. Also, a depropanizer not shown is usually used in conjunction with the rest of the fractionation equipment to discharge propane from the system.

Provisions are shown in the accompanying drawing so that, if desired, isobutane can be charged to acid treater 20 through lines 37 and 44 and 44', or alternatively, to acid treater 20 effluent in line 41, through lines 37 and 45, or to settler 24 effluent in line 42, through lines 37 and 46, or to extractor 26 through lines 37, 44 and 48.

Apparently, regardless of the amount of acid used in the acid treating step, some alkyl sulfates may dissolve in the acid phase, and especially if an excess of acid is used. The alkyl sulfates dissolved in the acid phase would normally be lost if not extracted in accordance with my process using, say, isobutane or other hydrocarbon in which the alkylation acid ester is soluble. Preferably the hydrocarbon is an isoparaffin which forms an alkylate after reaction with the olefin and alkylation acid ester in alkylation reactor 29. It has been found that the acid-oil complex is practically insoluble in hydrocarbons and very soluble in acid, and the alkyl sulfates, particularly the dialkyl sulfates, are soluble in hydrocarbons.

Although only a settling operation is shown following the acid treating step, in some cases it may be advantageous to use an efficient extraction on acid treater 20 effluent passing in line 41 to settler 24. For example, if vapor phase absorption of olefin is used in absorber 11, and substantially no hydrocarbon solvent is present in the absorber reaction mixture, and hydrocarbon such as isobutane is not added before the acid treating operation in acid treater 20, one can add a substantial amount of isobutane, and conduct an efficient extraction on the acid treater effluent. It is desirable to have isobutane present with the alkyl sulfates when they are charged to alkylation. If an efficient extraction is used on the acid treater effluent, it is not necessary to extract the raffinate or spent acid discharged from the efficient extraction step. If liquid phase absorption is used, it is possible for the absorber reaction product to have a large amount of unreacted hydrocarbon with it, for example propane and/or n-butane or isobutane may be added. In such a case additional solvent is not needed before the acid treating step. The n-paraffin solvent could be advantageously removed after the acid treatment and separation of the acid phase, before charging the organic phase to alkylation. If much unreacted olefin is also present, it can be removed prior to the acid treatment, or the acid treatment carried out under selective conditions to give preferential reaction of the polymeric oil rather than the olefin with the acid. Such conditions comprise short time, low temperature, acid in only the stoichiometric amount for the oil or a little less, and good mixing.

If it is desired to obtain the maximum recovery of acid and olefin, the alkyl sulfates dissolved in the acid phase from settler 24 can be recovered by passing the acid phase through lines 25 and 49 to extractor 26. A hydrocarbon solvent, such as isobutane, is also charged to extractor 26 through lines 37, 44 and 48. Spent acid comprising acid-oil complex and water are discharged from the system through line 51. The isobutane extract comprising alkyl sulfates is passed through line 28 to alkylation reactor 29.

Example 1

In the following example, the feed stocks shown in Table I are employed by the flow of FIG. 1.:

TABLE 1

|  | Isobutane (Wt. percent) | Propane-propylene (Wt. percent) | Butane-butylene (Wt. percent) |
|---|---|---|---|
| Ethane | | 0.4 | |
| Propylene | | 62.3 | 0.1 |
| Propane | 6.9 | 33.7 | 2.7 |
| Isobutane | 91.1 | 3.6 | 34.6 |
| n-Butane | 2.0 | | 11.0 |
| Isobutylene | | | 15.9 |
| Butylene-1 | | | 9.5 |
| Butylene-2 | | | 22.9 |
| Pentanes | | | 3.3 |
|  | 100.0 | 100.0 | 100.0 |

Five cubic centimeters per minute of used alkylation acid from alkylation settler 21 titrating 91.0% is charged to countercurrent absorber 11 near the top at 25° F. Fresh propanepropylene feed at the rate of 22.5 cubic centimeters per minute is charged to absorber 11 near the bottom at 30° F. Absorber 11 is operated at about 15 pounds per square inch gauge and 30° F. The gas evolved from the top of absorber 11 containing some unreacted propylene is condensed and charged to alkylation reactor 29. The acid phase from absorber 11 comprising 80% dipropyl sulfate is passed to acid treater 20 through line 14 and intimately mixed in a 600 cubic centimeter reactor at 50° F. with 0.1 cubic centimeter per minute of used alkylation acid of 91.0% concentration charged through lines 22 and 50 from alkylation settler 21.

The reaction product from acid treater 20 is mixed with 30 cubic centimeters per minute of isobutane in line 41 and passed to settler 24 through line 41. The upper organic phase from settler 24 comprising isobutane and diisopropyl sulfate is passed to alkylation reactor 29 through line 42. The lower acid phase from settler 24 comprising alkylation contaminants combined with acid and diisopropyl sulfate is charged to countercurrent extractor 26 near the top. Isobutane at the rate of 125 cubic centimeters per minute is charged near the bottom of extractor 26.

Spent acid is discharged from extractor 26 through line 51 at a rate of 1.9 cubic centimeters per minute, which is equivalent to a net overall fresh acid consumption of 0.18 pound per gallon of alkylate. It comprises alkylation contaminants including polymeric oil and water and some unextracted propyl acid sulfate and diisopropyl sulfate.

Fifty-three cubic centimeters per minute of butane-butylene feed through line 32 along with make-up isobutane, 160 cubic centimeters per minute of isobutane from deisobutanizer 36, hydrocarbon phase comprising diisopropyl sulfate from extractor 26 in lines 28 and 42, and 0.2 pound per hour of 97.5% sulfuric acid in line 25a are charged along with recycle acid from settler 21 in lines 43 and 33 to alkylation reactor 29 with efficient mixing at 40° F. Reaction mixture is passed to settler 21. The hydrocarbon phase is caustic and water washed and stabilized to produce 25 gallons per day of alkylate product.

The research octane of the stabilized alkylate is 95.3 clear and 106.9 with 3.0 cubic centimeters of TEL. The motor octane is 92.5 clear and 106.4 with 3.0 cubic centimeters of TEL.

For simplification the description of the invention has been made quite brief up to this point. However, some additional comments will be made regarding the various steps of the process in their order of use to give a better idea of the scope and conditions of operation.

Absorption

In the absorption step propylene is preferred as the olefin feed stock, although higher molecular weight olefins can be used, especially the butylenes and amylenes.

The absorption can be carried out in either vapor or liquid phase, or in a combination of the two. For example, the bulk of the absorption can be carried out in the vapor phase, followed by liquid phase for the final portion of the absorption step for a high conversion of the acid to dialkyl sulfates. Used alkylation acid having a titratable acidity of 88–93% by weight, is the preferred acid charge stock for the absorption step, although in some cases, for example, if amylenes are being alkylated, it can have a concentration as low as 80–85%. Acid from other sources, such as fresh acid, or acid from chemical reactions, and acid from the acid treatment of petroleum naphtha or lube oil can also be used. Although strong acid such as used alkylation acid is the preferred acid, weaker acids, such as those used in alcohol manufacture can be used if the conditions are adjusted. For example, acid having a titratable acidity of about 80% and containing about 15% of water can be used at about 160° F. with propylene.

When using strong acid with propylene, a temperature of 20–60° F. is satisfactory. When butylenes are used, especially isobutylene or isobutylene containing charge stocks, quite low temperatures and short times are advantageous and in countercurrent operation.

Relatively concentrated olefin stocks such as those from catalytic cracking are preferred, although from an economic standpoint lean stocks such as a lean propylene stock having only a value of fuel is advantageous and is satisfactory.

The absorption step can be effected in contacting equipment well known in the art, for example mixer-settlers, centrifugal contactors, countercurrent towers, or two or more mechanically stirred reactors operating to give countercurrent flow. Countercurrent contacting is preferred in order to obtain a high conversion of the acid to dialkyl sulfates, and in most cases for a high conversion of the olefin.

Acid treatment of absorber reaction mixture

The polymeric oil comprising cyclic conjugated dienes is quite unsaturated and it reacts readily with strong sulfuric acid, such as fresh make-up acid used for the alkylation step, or used alkylation acid of about 90% concentration. Weaker acid, for example, acid of about 80% concentration with 20% of water or 90% acid with 10% water can be used, but considerably more acid, in excess, is required. When weaker acid is used, more of the alkyl sulfates become dissolved in the excess acid. As a result, it becomes more important to extract the acid absorption phase with a hydrocarbon solvent when weaker acid is used. The acid-oil reaction product or complex and the alkyl sulfates are surprisingly stable over the conditions of operation. For example, quite good results have been obtained by acid treating in isobutane solution with used alkylation acid of about 90% concentration at a temperature of 85° F. and a time as long as one hour. However a temperature not over about 40–60° F. and a short time on the order of a few minutes or less are preferred. Actually, a very short time such as would be obtained in mixing with a pressure drop orifice appears to be satisfactory.

If enough excess acid, a long enough time and a high enough temperature are used, adverse reactions, such as conversion of the dialkyl sulfate to alkyl acid sulfate or even hydropolymerization could result. Hence minimum time, temperature and acid are advantageous.

The acid-oil reaction production is viscous but is free flowing under gravity conditions under the conditions of operation.

If solvent is not present during the acid treating step or present during the settling period, it is much more difficult to determine the interface between the acid phase and organic phase. In addition the solvent helps to give a low yield of the acid phase or a high yield of the desired organic phase. Thus, it is advantageous to have a solvent, such as isobutane, present during either the acid treating step and/or settling step following the acid treating step.

Extraction of acid phase

In general, reasonably low temperatures and reasonably short times are preferred for the hydrocarbon extraction of the acid phase from the acid treating step. For example, a temperature range of 30–60° F. with a few minutes residence time is satisfactory. However, reasonably good results have been obtained at ambient temperatures as high as 85–100° F. The conditions will depend somewhat upon the absorption product and the olefin used for the absorption step.

The extraction step can be effected in equipment known in the art, for example, mixer-settlers, centrifugal contactors, or countercurrent towers, for example, a Rotating Disc Contactor.

In general, it is easier to extract the dialkyl sulfate than the alkyl acid sulfate. Thus, it is desirable to use quite good and efficient conditions in the extraction step so as to extract not only the dialkyl sulfate, but also the alkyl acid sulfate, if present.

The raffinate or spent acid from the extraction step comprises water, alkyl acid sulfate, dialkyl sulfate and the reaction product of acid and polymeric oil formed during the alkylation, absorption, and acid treating steps. The extract comprises the hydrocarbon solvent, dialkyl sulfate and a limited amount of alkyl acid sulfate.

It is the objective to approach as nearly as possible only acid-oil reaction product and water in the spent acid or acid phase, with all of the alkyl sulfates in the extract or organic phase.

Alkylation

In general, the conditions for the alkylation step are those which are well known in the art. However, the bulk of the make-up acid is charged to alkylation as alkyl sulfates which result from the recovery section, and only a minor proportion of the acid is charged as the fresh make-up acid of the usual 98–99.5% concentration. Since the alkyl sulfates are substantially water free the trend is for the system catalyst, when using the acid recovery process, to be of lower water content and, in general, of superior quality in that a lower end point alkylate of higher octane value is obtained. If desired, less drying of charge stocks may be used, and in such a case the water content of the system catalyst could be as high as in conventional operation without acid recovery. The sulfuric acid in the alkylation system is usually maintained within a range of about 88–95% by purging spent acid from the system, and charging it to the recovery section. In a multiple reactor system the acid of the lowest concentration will be purged and sent to the acid recovery system.

A large excess of isobutane is used, for example, as much as 60–80 volume percent of the hydrocarbons in the alkylation reaction mixture. Consequently, a large quantity of isobutane must be recovered and recycled for reuse in the alkylation process. It is also available for the recovery process as described.

In addition to the olefin which is charged to the alkylation step in the form of alkyl sulfates additional fresh olefin is usually charged to the alkylation step. For example, when propylene and/or butylenes, and especially propylene, are used for the absorption step, it is advantageous to use butylenes also in the alkylation step.

What is claimed is:

1. In an alkylation process of an isoparaffin with an olefin in the presence of a sulfuric acid catalyst wherein used acid containing alkylation contaminants is contacted with at least two mols of olefin per mol of acid to produce an absorption product comprising predominantly dialkyl sulfate, and wherein dialkyl sulfate so formed is separated from said absorption product and is charged to an alkylation zone, the improvement comprising treating said absorption product prior to the separation of said dialkyl sulfate therefrom with an amount of sulfuric acid effective for the removal of at least part of the free polymeric oil present.

2. The improvement in accordance with claim 1 in which the amount of said sulfuric acid used for treating is about equal in weight to the amount of free polymeric oil present in said absorption product charged to the treatment thereof with sulfuric acid.

3. An improvement according to claim 1 wherein the sulfuric acid concentration in the alkylation process is at least 85%.

4. An improvement according to claim 1 wherein the isoparaffin being alkylated is isobutane.

5. An improvement according to claim 1 wherein the olefin feed contains propylene.

6. An improvement according to claim 1 wherein the acid treated absorption product is thereafter separated into a dialkyl sulfate phase and an acid phase and the dialkyl sulfate phase is passed to alkylation.

7. An improvement according to claim 1 wherein the dialkyl sulfate is separated from the absorption product by extraction with isobutane.

8. An improvement according to claim 1 wherein isobutane is added to the absorption product after the absorption product is acid treated.

9. In an alkylation process of an isoparaffin with an olefin in the presence of sulfuric acid catalyst wherein used acid containing alkylation contaminant is contacted with at least two mols of olefin per mol of acid to form an absorption product consisting of an acid phase comprising dialkyl sulfates and alkylation contaminant and a hydrocarbon phase comprising dialkyl sulfate and wherein the dialkyl sulfate is separated from the absorption product and charged to alkylation, the improvement which comprises mixing hydrocarbon solvent with said absorption product, treating resulting absorption product and hydrocarbon solvent with sulfuric acid, separating a first hydrocarbon phase and an acid phase, extracting said acid phase with isobutane forming a second hydrocarbon phase and a raffinate phase, and passing said first and second hydrocarbon phases to alkylation.

10. A process according to claim 9 wherein said hydrocarbon solvent is isobutane, the mixture of acid treated absorption product and isobutane is passed to countercurrent extraction with additional isobutane forming an extract phase comprising dialkyl sulfate and a raffinate phase comprising alkylation contaminants.

11. The process of claim 10 in which said extract phase is passed to alkylation.

References Cited

UNITED STATES PATENTS

| 2,364,451 | 11/1944 | Kohler et al. | 260—683.61 |
| 2,906,797 | 9/1959 | Beavon et al. | 260—683.61 |
| 3,227,774 | 1/1966 | Goldsby | 260—683.61 |
| 3,234,301 | 2/1966 | Goldsby | 260—683.61 |

DELBERT E. GANTZ, *Primary Examiner.*

G. J. CRASANAKIS, *Assistant Examiner.*

U.S. Cl. X.R.

260—683.61